J. H. ALBRECHT.
SUPPORT FOR WIND-SHIELDS.
APPLICATION FILED DEC. 5, 1918.
1,312,508.
Patented Aug. 12, 1919.
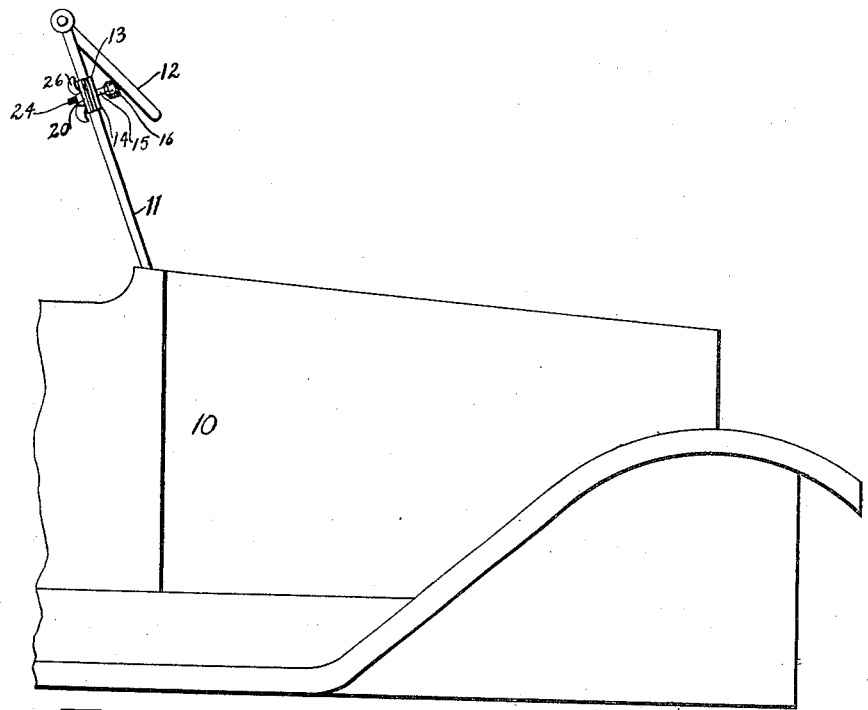
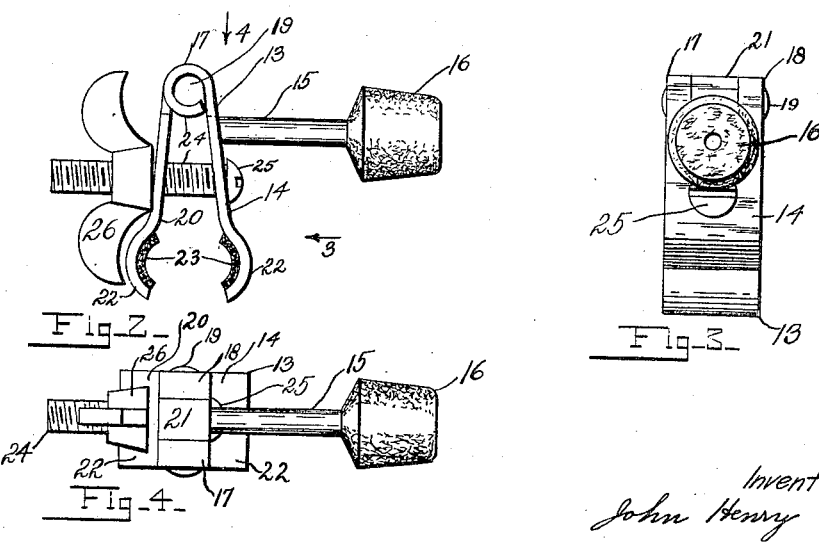
Inventor
John Henry Albrecht
By John W. Darley,
Attorney

UNITED STATES PATENT OFFICE.

JOHN HENRY ALBRECHT, OF BALTIMORE, MARYLAND.

SUPPORT FOR WIND-SHIELDS.

1,312,508.  Specification of Letters Patent.  Patented Aug. 12, 1919.

Application filed December 5, 1918. Serial No. 265,409.

*To all whom it may concern:*

Be it known that I, JOHN HENRY AL-BRECHT, a citizen of the United States, residing at Baltimore, in the State of Maryland, have invented certain new and useful Improvements in Supports for Wind-Shields; and I do hereby declare the following to be a full, clear, and exact description of the invention, such as will enable others skilled in the art to which it appertains to make and use the same.

My invention relates to supports for wind shields.

One object of my invention is to provide a support for a wind shield which will hold the wind shield securely in position.

A further object of my invention is to provide for securing my improved support in any one of a plurality of positions so that the wind shield may be adjusted as desired.

A further object of my invention is to provide a simple, cheap and effective support for a wind shield which can be applied to the wind shield as desired.

In the drawings:—

Figure 1 represents the forward part of the chassis of an automobile with one of my improved supports applied to the wind shield thereof.

Fig. 2 is a plan view of my improved support.

Fig. 3 is a view of the support shown in Fig. 2 looking in the direction of the arrow 3 in said figure.

Fig. 4 is a view of the support shown in Fig. 2 looking in the direction of the arrow 4 in said figure.

In the drawings:—

10 represents the forward part of the chassis of an automobile provided with usual side supports for the wind shield, one of which supports is shown as at 11, and with a folding member 12 forming a part of said wind shield.

In Fig. 1 my improved support 13 is shown adjustably secured upon the wind shield side support 11.

My improved support 13 comprises the following instrumentalities:—

14 is the supporting jaw to which the support rod 15 is secured in any approved manner. A buffer 16 is secured in any approved manner upon the outer end of the support rod 15. The buffer 16 may be formed of rubber, leather, felt or any approved material which will not mar the glass of the folding member 12 of the wind shield.

The supporting jaw is provided with two eyes 17 and 18 formed integrally therewith. The hinge pin 19 is rigidly supported in the eyes 17 and 18. The clamping jaw 20 is provided with an eye 21 revolubly supported upon the pin 19 between the eyes 17 and 18. The jaws 14 and 20 are provided at their free ends with curved portions 22—22 on the inside of which strips 23—23 of felt, leather or any approved material are secured in any approved way.

A screw 24 passes loosely through holes provided in the jaws 14 and 20 and said screw has a head 25 which bears against the outside of the jaw 14. A wing nut 26 threaded upon the body of the screw 24 bearing against the outside of the jaw 20 serves to clamp the jaws 14 and 20 securely upon the side support 11.

The manner of use of my improved support for wind shields is as follows:—

The curved portions 22—22 are placed around the side support 11, strips 23—23 serving to prevent the metal of said clamps from marring said support, and the support 13 is moved upwardly or downwardly until the buffer 16 rests against the glass in the folding member 12 of the wind shield. The wing nut 26 is then to be turned until the jaws 14 and 20 clamp firmly upon the side support 11.

It is evident that by moving my improved support 13 either upwardly or downwardly upon the side support 11 from the position shown in Fig. 1 the acute angle between the folding member 12 and the side support 11 may be increased or diminished respectively.

It is also evident that I may use a support similar to 13 on the side support on the other side of the car which is similar to 11.

Thus it will be noticed that I provide a simple, cheap and effective support for preventing the dropping of the folding member 12 and that my improved support can be made and sold as an accessory for application to any type of automobile.

While I have shown one embodiment of my invention, it is evident that many changes can be made therein without departing from the spirit thereof.

I claim:—

1. In a support for wind shields, the combination with a pair of hinged clamping jaws, of a screw and wing nut for forcing said jaws together, a support rod secured to one of said jaws and a buffer supported by said rod.

2. In a support for wind shields, the combination with a wind shield comprising a side support and a folding member, of a clamp adjustably secured to said side support and a buffer supported by said clamp for supporting said member.

In testimony whereof, I affix my signature.

JOHN HENRY ALBRECHT.

Copies of this patent may be obtained for five cents each, by addressing the "Commissioner of Patents, Washington, D. C."